United States Patent
Pabst et al.

(10) Patent No.: US 9,202,385 B2
(45) Date of Patent: Dec. 1, 2015

(54) METHOD FOR TRAINING A CREW MEMBER OF A, IN PARTICULAR, MILITARY VEHICLE

(75) Inventors: Manuel Pabst, München (DE); Michael Haubner, München (DE)

(73) Assignee: KRAUSS-MAFFEI WEGMANN GMBH & CO. KG, Munich (DE)

(*) Notice: Subject to any disclaimer, the term of this patent is extended or adjusted under 35 U.S.C. 154(b) by 290 days.

(21) Appl. No.: 13/634,835

(22) PCT Filed: Mar. 23, 2011

(86) PCT No.: PCT/DE2011/075046
§ 371 (c)(1),
(2), (4) Date: Sep. 13, 2012

(87) PCT Pub. No.: WO2011/116765
PCT Pub. Date: Sep. 29, 2011

(65) Prior Publication Data
US 2013/0004920 A1    Jan. 3, 2013

(30) Foreign Application Priority Data
Mar. 24, 2010 (DE) .......................... 10 2010 016 113

(51) Int. Cl.
G09B 9/05 (2006.01)
G09B 9/00 (2006.01)
G09B 9/042 (2006.01)
G09B 9/30 (2006.01)

(52) U.S. Cl.
CPC ................ *G09B 9/003* (2013.01); *G09B 9/042* (2013.01); *G09B 9/05* (2013.01); *G09B 9/307* (2013.01)

(58) Field of Classification Search
CPC .......................................................... G09B 9/05
USPC .............................................................. 434/69
See application file for complete search history.

(56) References Cited

U.S. PATENT DOCUMENTS

| 4,028,725 A | 6/1977 | Lewis |
| 4,884,137 A | 11/1989 | Hanson |

(Continued)

FOREIGN PATENT DOCUMENTS

| CA | 2266915 | 10/1999 |
| DE | 102005011616 | 12/2005 |

(Continued)

OTHER PUBLICATIONS

Kanbara, M.; Pattern Recognition, 2002, Proceedings, 16th International Conference, Registration for Stero Vision-based Augmented Reality Based on Extendible Tracking of Markers and Natural Features, p. 1045-1048, vol. 2.*

*Primary Examiner* — Robert J Utama
*Assistant Examiner* — Elroy S Crocker
(74) *Attorney, Agent, or Firm* — Thompson Hine LLP

(57) ABSTRACT

A method and simulator for training a crew member of a vehicle, especially a military vehicle, in the interior of the vehicle. A camera films the vehicle interior and is to be fixed to the head of the crew member. A display device is to be disposed in the field of view of the crew member and is to be fixed to the crew member's head. Via markers in the vehicle interior, the position of a view is defined, and at the position of the view, a detail of a virtual vehicle external environment is overlaid in the display device as a function of the position and viewing direction of the crew member.

19 Claims, 3 Drawing Sheets

(56) References Cited

U.S. PATENT DOCUMENTS

| | | | |
|---|---|---|---|
| 5,742,263 A | 4/1998 | Wang | |
| 5,781,437 A * | 7/1998 | Wiemer et al. | 701/2 |
| 6,166,744 A | 12/2000 | Jaszlics | |
| 6,181,371 B1 * | 1/2001 | Maguire, Jr. | 348/121 |
| 6,200,139 B1 * | 3/2001 | Clapper | 434/62 |
| 7,246,050 B2 * | 7/2007 | Sheridan | 703/8 |
| 2004/0104935 A1 * | 6/2004 | Williamson et al. | 345/757 |
| 2007/0184422 A1 | 8/2007 | Takahashi | |
| 2009/0087050 A1 | 4/2009 | Gandyra | |
| 2011/0076648 A1 * | 3/2011 | Lindheim et al. | 434/38 |
| 2011/0186625 A1 * | 8/2011 | Mangione-Smith | 235/375 |

FOREIGN PATENT DOCUMENTS

| | | |
|---|---|---|
| DE | 102004046144 | 3/2006 |
| DE | 202006018390 | 5/2008 |
| FR | 2889754 | 2/2007 |

* cited by examiner

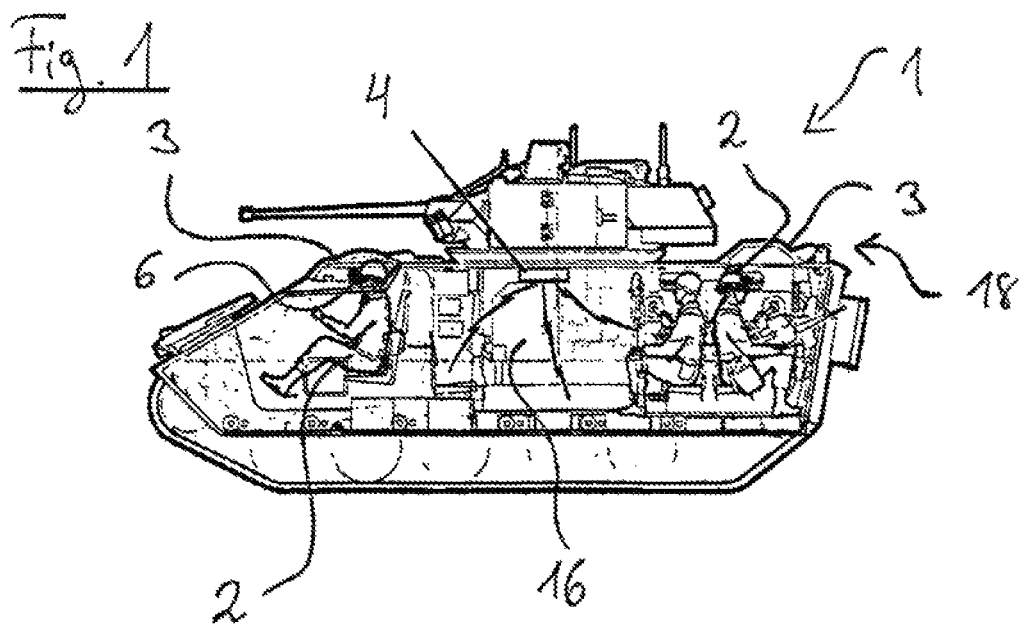
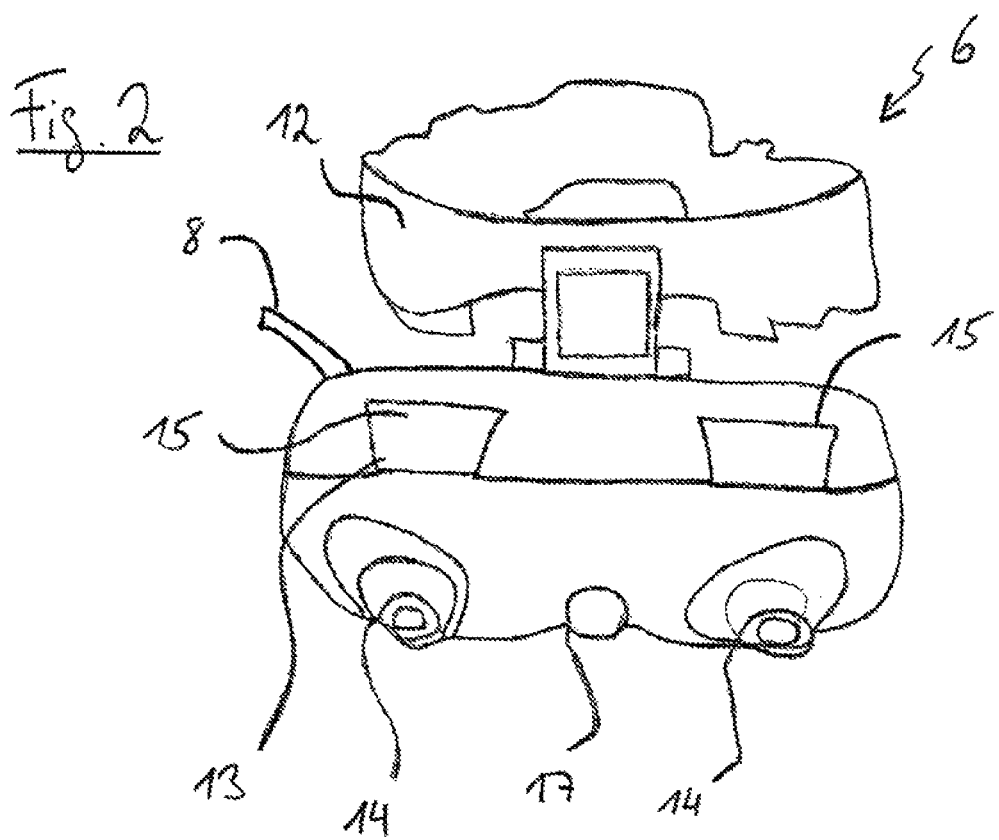

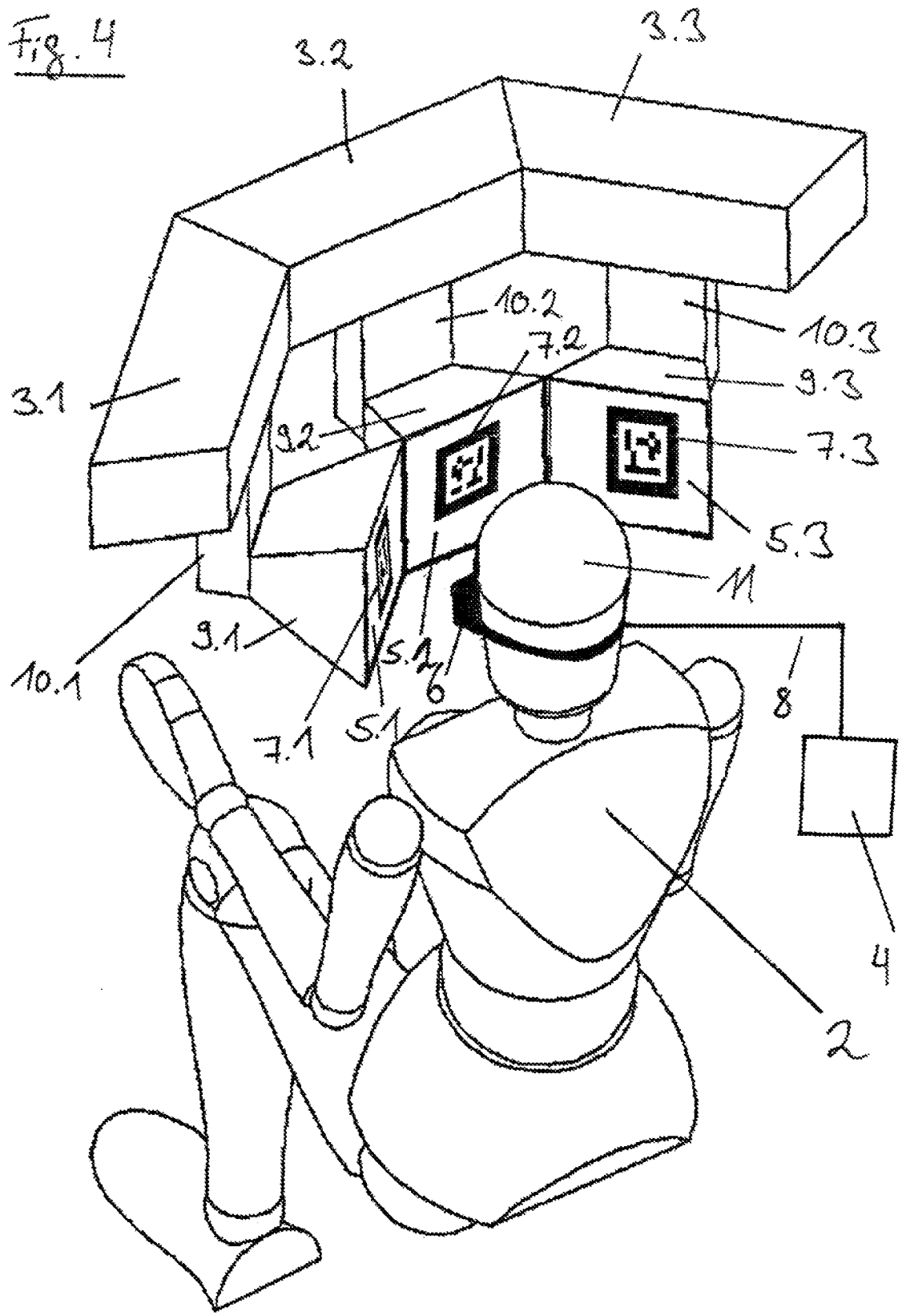

METHOD FOR TRAINING A CREW MEMBER OF A, IN PARTICULAR, MILITARY VEHICLE

The instant application should be granted the priority dates of Mar. 24, 2010, the filing date of the corresponding German patent application 10 2010 016 113.6, as well as Mar. 23, 2011, the filing date of the International patent application PCT/DE2011/075046.

BACKGROUND OF THE INVENTION

The present invention relates to a method for training a crew member of a vehicle, especially a military vehicle, in the interior of the vehicle, whereby a virtual vehicle external environment is produced, and also relates to a corresponding vehicle simulator for training a crew member.

To train a vehicle crew member, it is advantageous that the operation of the vehicle, or of a partial system of the vehicle, that is to be practiced be carried out in an environment that is as true to the original as possible. Of particular advantage is especially if the training takes place in the vehicle itself or in a vehicle interior that simulates the vehicle. It is furthermore advantageous if the vehicle is not actually placed into movement, but rather if the vehicle external environment is merely simulated, because in so doing the vehicle, in particular the drive components, do not have to be a part of the vehicle simulator. Furthermore, situations that are relevant to training can be simulated via the generation of virtual realities in a planned manner.

One method for training a crew member of a military vehicle is described in EP 0 947 797 A2, which discloses that the training of the tank crew members is carried out in stationary or permanent simulators, whereby the simulators represent the original tanks. By means of a simulation computer, a virtual vehicle external environment is produced, whereby this external view is illustrated on three image screens or monitors.

The drawback of this method is that with modern vehicles, especially military vehicles, a plurality of viewing windows are present, for example front, side or rear windows, periscopes or other optics, through which the crew member can see the vehicle external environment, so that a plurality of monitors is required. The contents of these monitors that display the virtual external environment must additionally be coordinated with the position and the direction of viewing of the student in order to achieve a high degree of near reality.

It is an object of the present invention to reduce the number of monitors that display the virtual external environment.

SUMMARY OF THE INVENTION

The method of the present invention realizes the object with the features of providing a camera that is configured to film the vehicle interior and to be fixed to the head of the crew member; providing a display device that is configured to be disposed in a field of view of the crew member and to be fixed to the head of the crew member; providing a marker in the vehicle interior; via the marker, defining the position of a view; and at the position of the view, overlaying in the display device a detail of a virtual vehicle external environment as a function of a position and viewing direction of the crew member. An inventive simulator comprises a camera that is configured to film the vehicle interior and to be worn by the crew member fixed to his or her head; a display device that is configured to be disposed in the field of view of the crew member and to be worn by the crew member fixed to his or her head; and a marker that can be disposed in the vehicle interior and defines the position of a view, whereby by means of a computer, at the position of the view, a detail of a virtual vehicle external environment can be overlaid in the display device as a function of the position and viewing direction of the crew member.

The training method of the present invention provides that the crew member wears a camera that is fixed to the head and films the vehicle interior, as well as a display device that is fixed to the head and is disposed in the field of view of the crew member.

Pursuant to the present invention, an in particular planar marker is furthermore disposed in the interior of the vehicle; by means of this marker, the position of a view is defined, whereby at the position of the view, a detail of the virtual vehicle external environment, as a function of the position and viewing direction of the crew member, is overlaid in the display device. Thus, the virtual external environment no longer has to be displayed by means of one or more display devices, since the virtual external environment, in a superimposed manner, is merely overlaid at the viewing positions in the display device that is disposed in the viewing field of the crew member; these positions of view are defined by the marker or markers in the vehicle interior. Thus, by means of the markers it is possible in the vehicle interior to define a location in which a view should be provided for the student.

Pursuant to one preferred embodiment, the camera image is illustrated on the display device, and the detail of the virtual vehicle external environment is overlaid in the camera image. Thus, by means of the camera and the display device, the crew member sees the vehicle interior. This interposition of the display device should advantageously adversely affect the view of the crew member as little as possible, in other words, the crew member should only minimally notice that he or she is not seeing the vehicle interior directly through his or her own eyes, but rather through the interposition of the camera and the display device. The vehicle interior represents the training space.

Alternatively, the display device can be partially transparent, so that the crew member can observe the vehicle interior through the display device, whereby at the position of the view, a detail of the virtual vehicle external environment is overlaid.

The display device and/or the camera can be part of a so-called Head Mounted Display (HMD, "display fixed to the head"), which is commercially available.

A particularly realistic training situation results if the marker is also disposed at the position of a real view in the vehicle interior, so that for the crew member a vehicle utilization is simulated with which the merely virtually overlaid view is also at that location at which the crew member is actually located in the real vehicle. Thus, the position of a real viewing window, especially a periscope or outer window of a vehicle, can be at the position of the view.

In a particularly advantageous manner, the marker is disposed, especially adhesively mounted, on the actual viewing window itself. As a result, the marker is not visible in the image of the crew member, since at this position the virtual image of the external environment is overlaid.

Pursuant to a particularly preferred embodiment, the viewing direction and/or the relative position of the crew member is determined by means of the marker, in so doing, for example, the marker cooperates with the camera in such a way that by means of a special optical tracking process, the relative position of the camera to the marker is determined, in particular via a computer, from which the direction of viewing, especially the head direction, and/or the position of the crew member, results.

Furthermore, pursuant to a particularly preferred embodiment, the direction of viewing and/or the absolute position of the crew member and/or and of the head can be determined. For this purpose, an in particular additional head movement sensor, especially an inertial sensor, can be utilized. If the head movement sensor is employed in addition to the tracking process, the rapidity and precision of the system is increased. In addition, an improved illustration of the virtual outer world is generated.

For a representation of the vehicle interior on the display device that is as realistic as possible, the camera should be displayed at the level of the eyes of the crew member. One camera is preferably used for each eye of the crew member. The display device can additionally be in a position to represent a stereoscopic image, thus increasing the closeness to reality.

If a plurality of views are present in the vehicle, a respective marker can be associated with these positions, so that with regard to each view, a detail of the virtual vehicle external environment can be illustrated.

The approximation of reality can be further increased by entirely covering or concealing the viewing field of the crew member. For this purpose, the display device can be embodied as opaque glasses, especially data glasses.

The marker, or markers, can be configured such that an unequivocal correlation results between the marker and the view, as well as an unequivocal positioning between camera and marker. The marker can have a code pattern, for example by being imprinted, whereby this code pattern is preferably configured in a checkerboard-like manner. A laminar marker, for example a paper marker, is preferably used. Known markers having a plurality of spheres can also be utilized, whereby the position of the view is established via the position of the spheres.

Individual components of embodiments of the invention are known in the state of the art and can be utilized with the invention.

For example, a Head Mounted Display is described in U.S. Pat. No. 4,884,137. One possibility for combining real and virtual image data is described, for example, in U.S. Pat. No. 6,166,744. A laminar marker having a code pattern is described, for example, in DE 10 2004 046 144 A1. Tracking methods are described, for example, in DE 2007 060 263 A1 or in DE 10 2005 011 616 A1, whereby the latter also discloses a paper marker having a code pattern.

An inventive vehicle simulator for training a crew member of a vehicle, in particular a military vehicle, in the vehicle interior is provided with a computer for generating a virtual vehicle external environment, with the simulator additionally including a camera that can be worn by the crew member fixed to the head and that films the vehicle interior, and a display device that can be worn by the crew member fixed to the head and is disposed in the viewing field of the crew member, as well as furthermore a marker that can be disposed in the vehicle interior and that defines a position of a view, whereby by means of the computer, at the position of the view a detail of the virtual vehicle external environment can be overlaid in the display device as a function of the position and viewing direction of the crew member. The vehicle simulator is thus configured in such a way that it can perform the above-described inventive method.

In other respects, the above-described advantageous further developments of the inventive method can also be used in the same manner with the inventive vehicle simulator.

The training in the vehicle can relate to all of the components of the vehicle, in other words, for example to the driving system, weapon system and/or communications system, so that for example the driving, firing and/or providing orders can in particular also be practiced independently of one another.

BRIEF DESCRIPTION OF THE DRAWINGS

One advantageous specific embodiment of the invention will be described with the aid of FIGS. 1 to 4, in which:

FIG. 1 shows a combat vehicle as a vehicle simulator;
FIG. 2 shows a Head Mounted Display;
FIG. 4 is a schematic illustration of one portion of the vehicle simulator of FIG. 1.

DESCRIPTION OF SPECIFIC EMBODIMENTS

Figure 3:
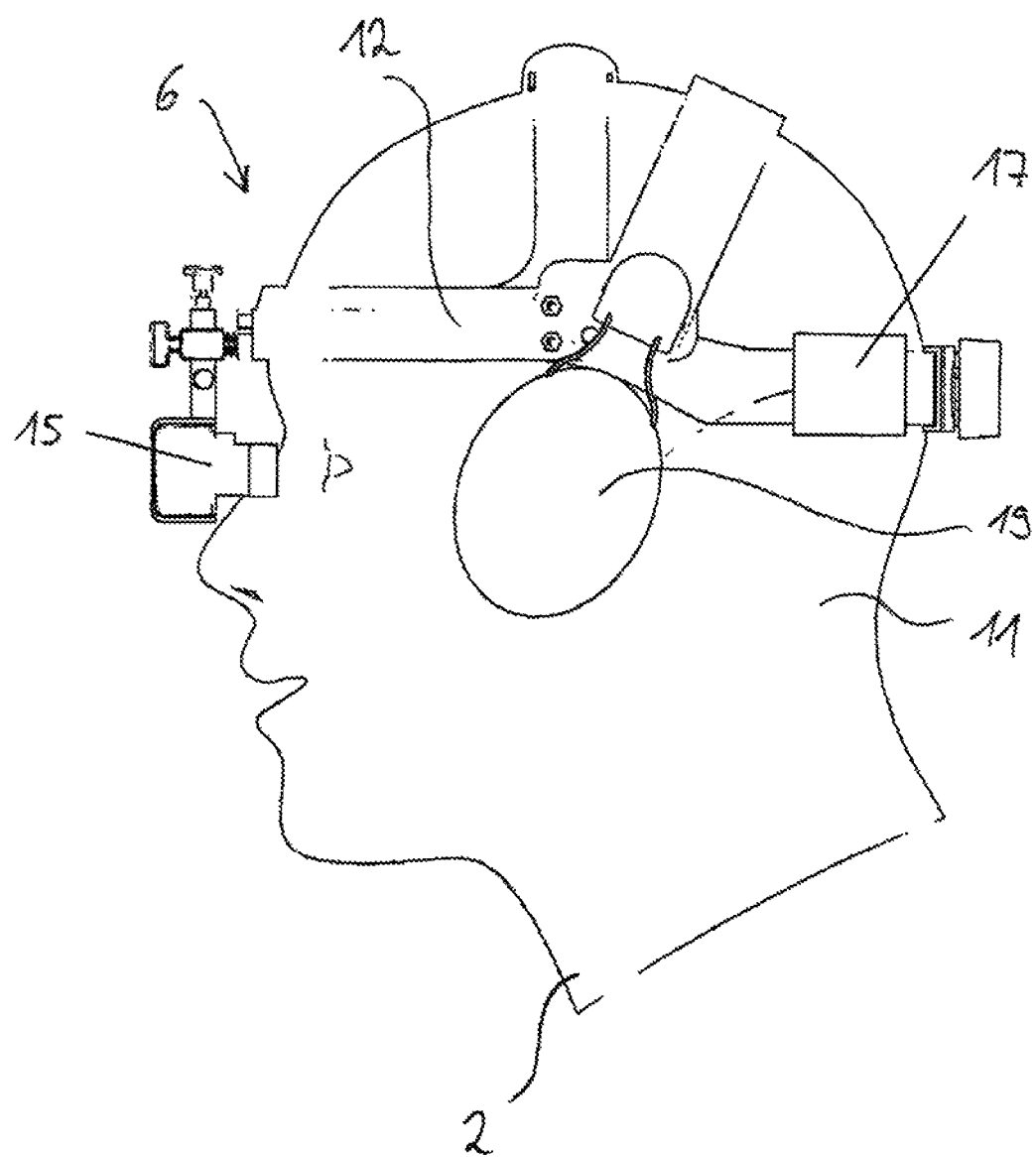
FIG. 3 shows a Head Mounted Display worn by a person.

FIG. 1 shows a combat vehicle 1 as a military vehicle 1, in which crew members 2 are located in the vehicle interior 16 for training purposes. The combat tank 1 here represents an original combat tank that can be used for training purposes. However, since the vehicle 1 need not be moved during the training, individual, in particular moving, parts can be omitted. The vehicle interior 16 should, nonetheless, conform to the original vehicle.

The vehicle 1 is provided with a plurality of views in the form of periscopes 3 through which the crew members 3 in the original vehicle 1 could observe the actual external environment 18. In the training operation of the vehicle 1, at the location of the viewing windows of the views 3, a detail, that is, a section, of a virtual vehicle external environment should be overlayed or superimposed. A simulation computer 4, which can be disposed within the vehicle 1 and additionally can be coupled with the vehicle system computer, serves for the generation of the virtual external environment so that the actual vehicle operation can be coupled with the simulation. A Head Mounted Display (HMD) 6, a respective one of which is worn by the crew members 2 that are to be trained, serves for the indication of the virtual vehicle external environment in place of the actual external environment 18.

The virtual vehicle external environment is a representation, generated by the computer 4, of an imaginary, 3-dimensional environment of the vehicle 1 that includes exclusively computer-generated elements. A detail of the virtual vehicle external environment is a portion of the overall virtual vehicle external environment that corresponds to the view of an observer of the virtual vehicle external environment in a spatial direction or through a view 3, that is, a look-out, of the vehicle, in particular a viewing window or a viewing device.

FIGS. 2 and 3 show different embodiments of a Head Mounted Display 6, which is designed as information or data glasses 13, and can be fastened to the head 11 of the person to be trained 2 by means of a fastening device 12, for example a flexible band. The Head Mounted Display 6 is furthermore provided with a display device 15, which is comprised of two monitors, each of which is disposed in front of one of the eyes of the crew member 2.

The Head Mounted Display 6 is furthermore provided with cameras 14 that are disposed on the glasses 13 and each one of which is disposed in front of one of the eyes of the crew member 2, thus making possible a stereoscopic image representation upon the display devices 15. The cameras 14 and the display devices 15 are thus fixed to the head, i.e. they follow a change in position or movement of the head 11 of the crew member 2.

If a crew member 2 wears the Head Mounted Display 6 that is secured to the head, the camera images of the vehicle interior 16 of the cameras 14 are imaged to him or her in real time on the display devices 15, so that he or she hardly notices the wearing of the data glasses 13, and thus views the vehicle interior via the interposition of the camera 14.

The Head Mounted Display 6 is furthermore provided with a head sensor 17 that is embodied as an inertial sensor and has three degrees of freedom via which the viewing direction of the head 11 can be determined. The head sensor has a compass in order to be able to absolutely measure the direction of yaw. A headphone 19 can also be provided.

The data connection between display device 15 and computer 4 or camera 14 and computer 4, can, as illustrated in FIG. 1, be wireless or, as illustrated in FIGS. 2 and 4, be effected by means of a data cable 8.

The schematic illustration of FIG. 4 shows the training space in the vehicle interior 16 of the vehicle 1 of FIG. 1. The crew member 2 sits in front of three periscopes, each of which is comprised of a viewing portion 3.1, 3.2, 3.3, an optical unit 10.1, 10.2, 10.3, which is guided through the roof of the vehicle, and a viewing component 9.1, 9.2, 9.3, each of which has a viewing window 5.1, 5.2, 5.3, through which in normal operation, i.e. in non-training operation, the crew member can observe the vehicle external environment 18.

The training process takes place when the vehicle is not moving. In the simulation operation, at the location of the viewing windows 5.1, 5.2, 5.3, a detail of the virtual external environment simulated by the computer 4 is to be represented. For this purpose, laminar paper markers are glued or otherwise stuck to the viewing windows 5.1, 5.2, 5.3; the paper markers are provided with a unique, checkerboard-like code pattern. Via the camera 14 of the Head Mounted Display 6, and by means of a tracking process installed in the computer 4, the position of the markers within the camera image of the vehicle interior 16 can be determined and followed, so that at this location, in conformity with the position and viewing direction of the crew member 2, a detail of the virtual vehicle external environment produced in the computer 4 can be overlaid in the camera image. Thus, by means of the camera 14 and the display devices 15, the crew member 2 sees the vehicle interior 16, whereby at the locations of the markers 7.1, 7.2, 7.3 a simulated external environment is overlaid.

The markers 7.1, 7.2, 7.3 thus define the positions of the details during the training of the crew member 2. If the position of the crew member 2 or the crew member's viewing direction changes, by means of the tracking process via the markers 7.1, 7.2 7.3 and the camera 14, the detail of the virtual vehicle external environment is correspondingly followed and changed.

During the training process, the crew ember 2 does not see the actual environment 18 of the vehicle 1, but rather the virtual environment, which serves as the complete simulation of an external environment. At the positions defined by the markers 7.1, 7.2, 7.3, a completely imaginary environment is thus displayed to the members 2 that are to be trained, whereby this environment can be generated and controlled for training purposes.

Thus, pursuant to the present invention, the use of monitors within the vehicle can be eliminated. The number of devices needed to display the virtual environment is reduced to merely the display device 15 in the Head Mounted Display 6.

A virtual exterior view is played or shown to the crew member 2 via the Head Mounted Display 6, as a consequence of which the crew member can carry out training, for example even combat exercises, in this artificial reality. To ensure that the user 2 has the impression of looking at actually present viewing windows 5.1, 5.2, 5.3 of a periscope or external window, the image content should be adapted to head movements. This is aided by a Head Tracking System, which includes the inertial sensor 17 that can be mounted on the head, and by means of which an absolute rotation of the head 11 of the user can be detected.

It is possible for the user 2 to see the actual world through the Head Mounted Display in that the image of the tracking camera 14 that is mounted on the Head Mounted Display 6 is displayed to the user on the display devices 15 of the Head Mounted Display. In so doing, in this scenario the camera view initially covers or obscures the virtual environment. By means of the technique that is also known as stenciling, the camera image that is overlaid over the virtual image can be stamped out at this location and can thus be made transparent. This should occur precisely at the position at which the optical tracking recognizes a marker 7.1, 7.2, 7.3 in the camera image, whereby offsets in position or rotation can be programmed to that of the marker. The shape of the stamping can be freely defined from the size and shape of the marker 7.1, 7.2, 7.3. The spatial position is adapted to the duration of transmission of that of the marker 7.1, 7.2, 7.3. Since due to their varying code patterns the markers 7.1, 7.2, 7.3 are distinguishable for the system, different stamping shapes can also be utilized for different markers 7.1, 7.2, 7.3.

Due to a movement of the head 11 in front of, for example, a viewing window 5.1, 5.2, 5.3 provided with a marker 7.1, 7.2, 7.3, the spatial position of the virtual viewing window also changes. For example, if the user 2 comes closer to the window, it becomes larger, and the user sees a greater detail of the virtual external environment. If the user 2 observes the window largely from the side, the viewing angle becomes flat, just as the case would be with a real viewing window. The virtual world that the user 2 observes through this virtual window is represented in conformity with the orientation of the head sensor 17. Thus, for example, the virtual horizontal tilts if the head 11 of the user tilts, whereby turning of the head 11 in the real world also results in a corresponding direction of viewing in the virtual world.

With the marker process, the position of the markers in front of the user, not however the position of the user 2, in the room is initially detected. For this purpose, a system for the absolute recognition of position is required. One possibility would be to realize this via the markers, whereby for this purpose the exact positions and orientations of the markers 7.1, 7.2, 7.3 relative to one another must be known, which can be achieved by means of a measurement. However, due to the use of the inertial sensor 17 that is fixed to the head, the expenditure of the measurement can be saved.

A negligible drawback in the operating mode that was presented is that a change in position of the user manifests itself only upon the position of the viewing window 5.1, 5.2, 5.3, but not upon the position in the virtual world. To this extent, the process is preferably usable with such training spaces where the person 2 that is to be trained sits and thus does not significantly change his or her position.

By means of an ability to switch to a virtual complete image view in a Head Mounted Display 6, with which exclusively virtual images are represented upon the display device 15, it is additionally possible to realize simulation scenarios where the person 2 that is to be trained finds himself virtually outside of the vehicle 1, for example "over hatch" or 'dismounted', although in reality being disposed within the vehicle 1.

Pursuant to a modification of the exemplary embodiment, the display device 15 can be partially transparent. In this case, it is not necessary to illustrate the image of the vehicle interior taken by the camera 14 on the display device 15. Rather, the crew member can perceive the vehicle interior directly through the partially transparent display device 15. For the representation of the virtual vehicle external environment, with the aid of the camera 14, the positions of the markers 7.1, 7.2, 7.3 are determined. At the locations of the markers 7.1, 7.2, 7.3, details of the virtual vehicle external environment are overlaid in the display device 15, whereby the remaining regions are transparent in the display device 15.

The specification incorporates by reference the disclosure of German application 10 2010 016 113.6 filed Mar. 24, 2010, as well as International application PCT/DE2011/075046 filed Mar. 23, 2011.

The present invention is of course, in no way restricted to the specific disclosure of the specification and drawings, but also encompasses any modifications within the scope of the appended claims.

REFERENCE NUMERALS

1 Vehicle
2 Crew Member
3 Periscope
4 Computer
5 Viewing Window
6 Head Mounted Display
7 Marker
8 Data Connector
9 Viewing Component
10 Optical Unit
11 Head
12 Fastening Device
13 Data Glasses
14 Camera
15 Display Device
16 Vehicle Interior
17 Inertial Sensor
18 Actual Vehicle external Environment
19 Headphone

The invention claimed is:

1. A method for training a crew member of a vehicle, especially a military vehicle, in the interior of the vehicle, including the steps of:
providing a camera that is configured to film the vehicle interior and to be fixed to the head of the crew member;
providing a display device that is configured to be disposed in a field of view of the crew member and to be fixed to the head of the crew member;
providing a marker in the vehicle interior;
via said marker, defining the position of a look-out; and
at the position of the view, overlaying in said display device a section of a virtual vehicle external environment as a function of a position and viewing direction of the crew member.

2. A method according to claim 1, which includes the further steps of illustrating an image of said camera upon said display device, and overlaying the section of the virtual vehicle external environment into the camera image.

3. A method according to claim 1, wherein said display device is partially transparent.

4. A method according to claim 1, wherein at least one of said display device and said camera are part of a Head Mounted Display.

5. A method according to claim 1, wherein said marker is disposed at the position of said look-out.

6. A method according to claim 5, which includes the further step of disposing the position of said look-out at the position of a real viewing window, in particular a periscope or outer window, of the vehicle.

7. A method according to claim 1, which includes the step of disposing, especially adhesively mounting, said marker on a viewing window.

8. A method according to claim 1, which includes the step of determining at least one of the viewing direction and the position of the crew member by means of said marker.

9. A method according to claim 8, which includes the step of determining at least one of the viewing direction and the position of the crew member by means of said marker and said camera via a tracking process.

10. A method according to claim 1, which includes the step of determining at least one of the viewing direction and the position of the crew member via a head movement sensor, especially an inertial sensor.

11. A method according to claim 1, which includes the step of disposing said camera at a level of the eyes of the crew member.

12. A method according to claim 11, which includes the step of providing one camera for each eye of the crew member.

13. A method according to claim 1, wherein said display device illustrates a stereoscopic image.

14. A method according to claim 1, which includes the steps of representing the positions of a plurality of views via a respective section of the virtual vehicle external environment, and associating one of said markers with each position.

15. A method according to claim 1, wherein said display device entirely covers or conceals the viewing field of the crew member.

16. A method according to claim 1, which includes the step of providing said marker with a code pattern.

17. A method according to claim 16, wherein said code pattern is checkerboard like.

18. A method according to claim 1, which includes the step of determining the position of said marker via an, in particular optical, tracking process.

19. A vehicle simulator for training a crew member of a vehicle, especially a military vehicle, in the interior of the vehicle, comprising:
a computer for generating a virtual vehicle external environment;
a camera configured to be worn fixed to the head of the crew member and to film said vehicle interior;
a display device configured to be worn fixed to the head of the crew member and to be disposed in a field of view of the crew member; and
a marker configured to be disposed in said vehicle interior, wherein said marker defines a position of a look-out, and wherein at the position of said look-out, said computer is configured to overlay, in said display device, a section of the virtual vehicle external environment as a function of the position and viewing direction of the crew member.

* * * * *